Sept. 13, 1938.  A. E. ROTH  2,129,966

TRAP TIMER

Filed Oct. 12, 1936  2 Sheets—Sheet 1

INVENTOR.
Arthur E. Roth
BY
ATTORNEY

Sept. 13, 1938.   A. E. ROTH   2,129,966

TRAP TIMER

Filed Oct. 12, 1936   2 Sheets-Sheet 2

INVENTOR.
Arthur E. Roth
BY
Thomas W. Rowe
ATTORNEY

Patented Sept. 13, 1938

2,129,966

UNITED STATES PATENT OFFICE 2,129,966

TRAP TIMER

Arthur E. Roth, Prairie Du Chien, Wis.

Application October 12, 1936, Serial No. 105,270

8 Claims. (Cl. 200—33)

The present invention relates to a time delay actuating mechanism for use in trap and skeet shooting. In skeet shooting particularly it is required that the trap operator operates the trap to throw out clay pigeons some time between zero and three seconds after the shooter calls, "Pull".

Where it is left to the trap operator to decide the interval, the operator is apt to get into a fixed cycle so that the shooters can tell approximately when the target will be released. Also there is a possibility that the trap operator might attempt to favor one of the shooters over the others by giving the favored shooter a definite time interval each time he fires or a certain definite cycle of intervals so that the shooter will know when his target is to leave the trap so that the shooter thus favored can start his gun to his shoulder at that instant without waiting to see the target.

An object of the present invention is to make an improved delayed action electrical contact mechanism.

Another object is to make a delayed action contact mechanism with signal means to indicate the initiation of the actuation of the device.

Another object is to make a delayed contact mechanism for an electrically released target trap with automatically varied time intervals between an actuation of said device and the closing of a contact.

In order to attain these objects there is provided in accordance with one feature of the invention a setting lever mounted to move a weight into an engagement with a latch to hold the weight in a suspended position, the setting lever having operative connection with a spring pendulum having a signal device associated therewith. Ratchet and pawl means are provided in conjunction with the spring pendulum to operate a cam to release the weight at a predetermined point in the cycle of operation of said cam. The fall of the weight actuates a switch mechanism to close an electrical circuit from a source of electrical energy through an electrical trap releasing means to actuate a target trap. A signal is operated simultaneously with the initiation of the timing mechanism to insure against improper actuation of the device.

These and other features of the invention will be more fully set forth in the following description and in the accompanying drawings herein.

Figure 14:
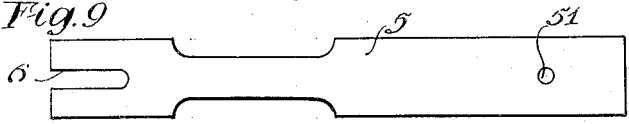
Figure 14 is a plan view of a pendulum spring.

Referring to the drawings in detail the supporting framework comprises a base plate 1 which is preferably of comparatively heavy and rigid sheet metal. A vertical center plate 2 has the lower end thereof bent at right angles and secured to the base plate as by spot welding (not shown). A rectangular steel block 4 is fixedly secured to the plate 2 as by means of screws (not shown) and a pendulum spring 5 having an elongated notch 6 (see Figure 14) is mounted against the face of the block 4 and a pair of screws 7 passing through openings (not shown) of a size to freely receive the screws 7 threadedly engaging the plate 8 to draw the plate 8 firmly against the spring 5 to fixedly secure the spring 5 in position.

A plate 10 is secured to the block 4 as by screw 11 and is provided with a portion 12 bent at right angles to form a housing for a metal weight block 13 which is inserted between the portion 12 and the block 8 to have a free sliding fit therein.

Figure 1:
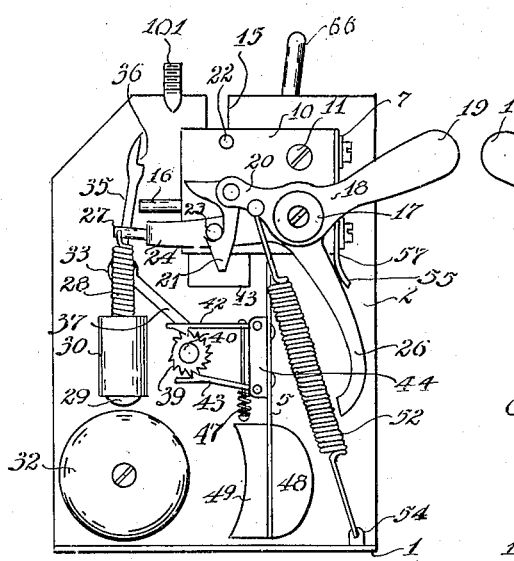
Figure 1 is a view in side elevation of a trap contact mechanism embodying the present invention, with a housing removed, the device being shown in an unoperated condition.
Figure 3:
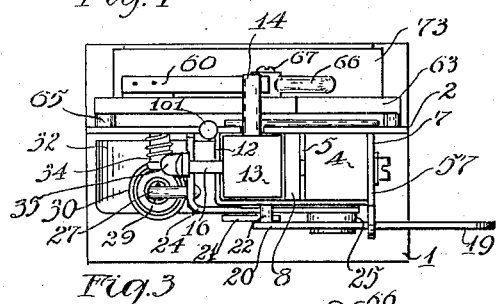
Figure 3 is a top view of the device shown in Figures 1 and 2.
Figure 4:
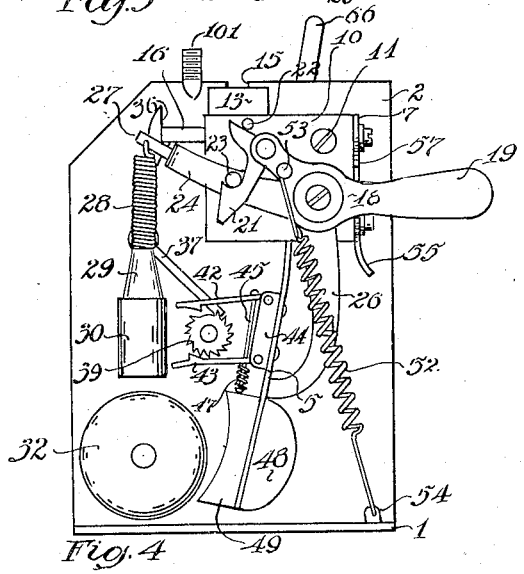
Figure 4 is a view similar to Figure 1 showing the operating lever in the position that it occupies just before the time mechanism has been released for actuation.

A switch operating pin 14 is fixedly secured to the block 13 to project laterally therefrom and rides in a notch 15 in the plate 2. A second pin 16 projects from the left hand side of the block 13 (as shown in Figures 1, 3 and 4) and rides in a notch provided therefor in the portion 12 of the plate 10 (see Figure 3).

A pivot post 17 is threadedly inserted through the plate 10 and into the block 4. Pivotally mounted on the post 17 is a manually operated lever 18 having a handle portion 19 which projects laterally beyond the plate 2. The lever 18 is provided with a portion 20 extending oppositely from the handle portion 19. Pivotally mounted on the outer end of the portion 20 is a catch 21 having a downwardly extending notched portion and a laterally extending portion adapted to engage a pin 22 mounted on the plate 10 when the lever 18 is rotated in a clockwise direction beyond the position shown in Figure 4. The notch in the downwardly extending portion of the lever 21 is adapted to engage a pin 23 on a second lever 24 also pivotally mounted on the post 17. A spring 21a forces the catch resiliently toward the pin 23. The lever 24 is separated from the lever 18 by a spacing washer 25. The lever 24 has a downwardly extending portion 26 adapted to engage the pendulum spring 5. The left hand end of the lever 24 (as shown in Figures 1, 3, and 4) is bent inwardly at right angles as best shown in Figure 3 to engage the pin 16 on a clockwise rotation of the lever 18 and a pin 27 is fixedly secured to this bent portion of the lever 24 to extend outwardly therefrom.

Figure 6:
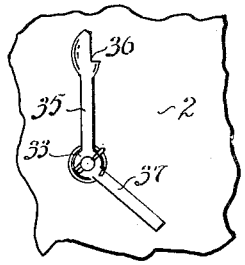
Figure 6 is a fragmentary view showing a cam actuated latch member.
Figure 7:
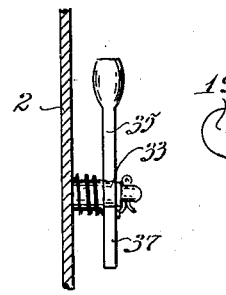
Figure 7 is a side view of the fragment shown in Figure 6.
Figure 8:
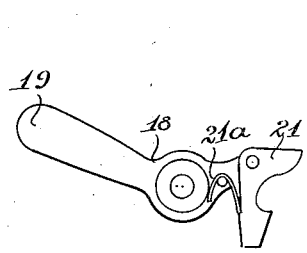
Figure 8 is a side view of a manually operated lever showing the opposite side of said lever and associated parts from that shown in Figure 1.
Figure 9:
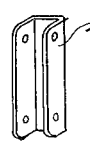
Figure 9 is a view in perspective of a pawl support channel.

The upper end of a coiled spring 28 is inserted in the pin 27 and a weight 29 is secured in the lower end of the spring 28. The weight 29 rides freely in a tubular guide 30 supported by a bracket 31 (see Figure 5) connected to the plate 2. A bell 32 is mounted beneath the tubular guide member 30 in a position to be struck by the weight 29 when the weight is dropped during an actuation of the device. A latch lever 33 is pivotally mounted on a post 34 mounted on the plate 2 and has an upwardly extending arm 35 having a notch 36 in the upper end thereof to engage the pin 16 on an upward movement of the weight block 13 to retain the block 13 in suspended position. A second arm 37 of the lever 33 is mounted to ride in a groove 38 in ratchet wheel 39 pivotally mounted on post 40 on the plate 2. The lever 33 is held in position by means of a cotter key 41 (see Figures 7 and 6) and engagement of the lower end of the arm 37 with the groove 38 holds the ratchet wheel 39 in position on the supporting post 40.

Figure 10:
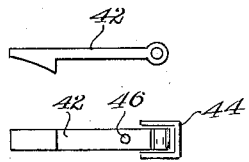
Figure 10 shows a side and bottom elevation of a cam actuating pawl, the lower view showing the pawl mounted in the housing shown in Figure 9.
Figures 11, 12:
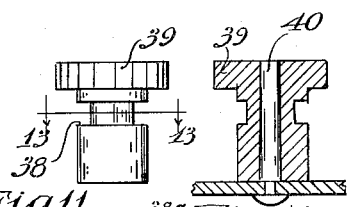
Figure 11 is a view in side elevation of a ratchet and associated cam member.
Figure 12 is a longitudinal sectional view of the device shown in Figure 11.
Figure 13:
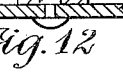
Figure 13 is a transverse sectional view on the line 13—13 of Figure 11.

The periphery of the bottom of the groove 38 is formed as a cam as indicated in Figure 13 so that when the high point of the cam is in engagement with the arm 37 of lever 33 it will rotate the lever 33 in a counter-clockwise direction to release the notch 36 from pin 16. A pair of pawls 42 and 43 are pivotally mounted in a channeled support 44 riveted to the spring 5. A pin 45 passes through openings 46 in each of the pawls 42 and 43 (see Figure 10) and a light coil spring 47 resiliently urges the pawls toward each other into engagement with the ratchet wheel 39. A weight on the lower end of the spring 5 comprises two portions 48 and 49 secured together and to the spring 5 by means of a screw 50 passing through an opening in the portion 48, through an opening 51 in the spring 5, (see Figure 14) and threadedly engaging the portion 49.

A coil spring 52 has the upper end thereof connected to a pin 53 mounted on the lever 18, the lower end of the spring 52 being in hooked engagement with a lug 54 secured to the bottom plate 1 to resiliently urge the lever 18 in a counter-clockwise direction toward the position shown in Figure 1.

Figure 5:
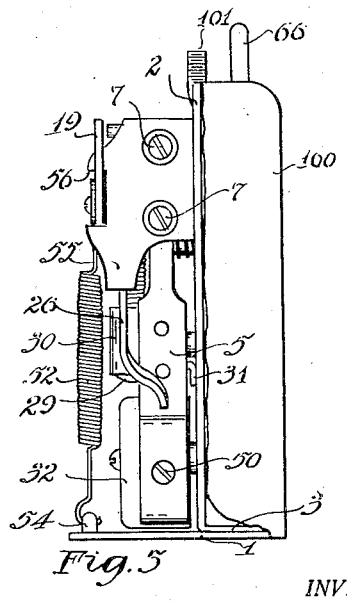
Figure 5 is an end view of the device shown in Figures 1 to 4 inclusive. The parts being in the positions illustrated in Figure 1.

A plate 57 is mounted on the right hand face of the block 4 (as shown in Figures 1, 3 and 4) and is held in position thereon by means of the screws 7. The plate 57 projects beyond and below the block 4 as best shown in Figures 3 and 5. The downwardly extending portion 55 thereof acts as a stop to limit the movement of the downwardly extending portion 26 of the lever 24. The laterally extending portion of the plate has a notch 56 therein to limit the movement of the lever 18.

A spring 58 is mounted on the rear of the vertical plate 2 (see Figure 2) to lie beneath the pin 14 adjacent to the lower end of the notch 15 to normally hold the pin 14 slightly above the bottom of the notch 15. When the weight block 13 is dropped from the position illustrated in Figure 3 during an operation of the device the pin forces the spring 58 downward causing the pin 14 to engage a post 59, of insulating material, is mounted on an upper contact spring 60 of a normally open switch 61 thereby momentarily closing the switch 61. The contact spring 60 and a second contact spring 62 are mounted on an insulative block secured to a panel 63 of insulative material such as phenolic condensation material. This panel 63 is secured to the plate 2 in spaced relation therefrom as by means of screws 64 and spacing sleeves 65 (see Figure 3).

A lever 66 is pivotally mounted on a pivot screw 67 secured to the panel 63 and having frictional engagement with the post 67 to hold it in adjusted position. A lever 66 has a tongue 68 positioned between a pair of normally closed switches 69 and 70. The switch 69 has an insulative post 71 mounted above the tongue 68 and switch 70 has similar insulative post 72 mounted below the tongue 68 so that when the lever 66 is swung in a clockwise direction from the position indicated in Figure 2 the tongue 68 will depress the post 72 to open the switch 70 while if the lever 66 is swung in a counter-clockwise direction from the position shown in Figure 2, it will raise the post 71 to open the switch 69.

Figure 15:
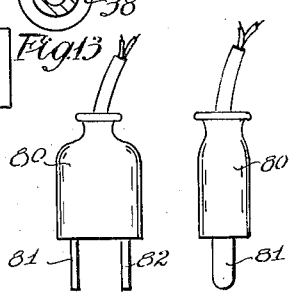
Figure 15 shows side and end edge views respectively of an electrical switch plug.

A three plug receptacle 73 has three pairs of openings therein, the left hand pair of said openings (seen in Figure 2) being numbered 74 and 75 respectively, the center pair of openings being numbered 76 and 77 respectively and the right hand pair being numbered 78 and 79 respectively. The switches 61 and 69 and 70 are connected by means of concealed wiring lying in the rear of the panel to the various receptacle openings according to the circuit indicated in Figure 16. Electrical contact plugs 80 (see Figure 15) are each provided with a pair of prongs 81 and 82 insertable in each of the pairs of openings in the receptacle 73 to connect the device to a suitable source of electrical energy such as a battery of electric cells and also to a pair of electric trap releasing mechanisms indicated in Figure 16 mounted on a pair of target traps (not illustrated).

Figure 16:
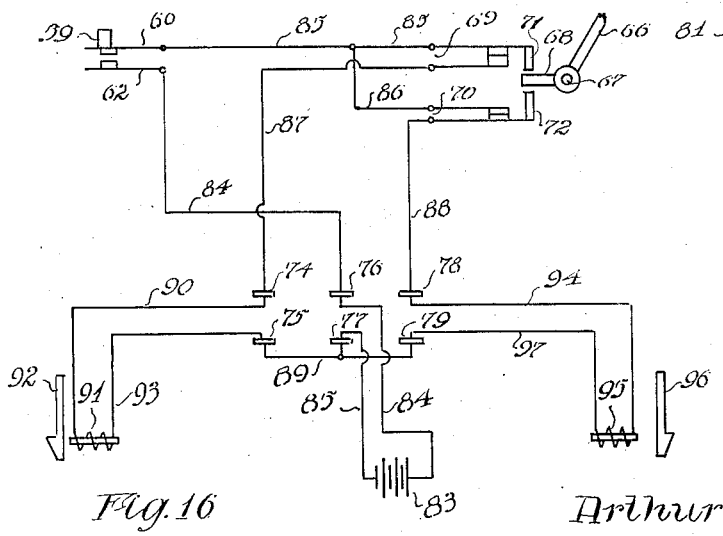
Figure 16 is a schematic drawing of an electrical circuit employed in operation of the device.

Referring to the circuit illustrated in Figure 16 an electric battery 83 is connected by conductors 84 and 85 by means of a plug 80 (not indicated in the circuit drawing) to the center receptacle openings 76 and 77 respectively. From the receptacle opening 76 a conductor 84 is connected to the contact spring 62 of the normally open switch 61. From the other contact spring 60 thereof, a conductor 85 is connected to one contact spring of the normally closed switch 69. A conductor 86, connected to the conductor 85 is connected to one contact spring of the other normally closed switch 70. From the other contact spring of the switch 69 a conductor 87 is connected to the receptacle opening 74 while from the other contact spring of the switch 70 from that to which the conductor 86 is connected, a conductor 88 is connected to the receptacle opening 78. From the conductor opening 77 a conductor 89 is connected to both of the receptacle openings 75 and 79. From the receptacle opening 74 a conductor 90 is connected to one terminal of an electro-magnet 91 positioned adjacent to a magnetically permeable target release member 92. From the other terminal of the electro-magnet 91 a conductor 93 is connected to the receptacle opening 75. From the receptacle opening 78 a conductor 94 is connected to one terminal of an electro-magnet 95 similar to the magnet 91 and positioned adjacent to a magnetically permeable release sear 96 mounted on another trap from that carrying the sear 92. The other terminal of the electro-magnet 95 is connected by means of a conductor 97 to the receptacle opening 79. A sheet metal housing 100 of a conventional type may be secured in position over the device by means of a threaded stud 101 secured to the vertical plate 2 to pass through an opening in the top of the housing. A thumb screw, not shown, may be threaded onto the stud 100 to secure the housing in place.

*Operation*

Assuming that the device is to be used for the operation of two traps simultaneously and that both of the traps are loaded and set and ready for operation, that each of the traps is provided with an electrical release mechanism, and that these electrical release mechanisms are connected to the device by suitable electric conductors and plugs such as plug 80 as shown in Figure 3, the operation of the device is as follows:

An electric battery 83 is connected by suitable conductors and a plug such as the plug 80 to the center openings 76 and 77 in the receptacle 73. The shooter is on the firing line and the operator is positioned at the device embodying the present invention with one hand on the handle 19. At the shooters command, "Pull," the operator depresses the lever 19 to its full limit of operation. The operation of the device can best be divided into three stages.

During the first stage of operation the lever 18, by means of the notched catch 21 and pin 23 moves the lever 24 upwardly to the position shown in Figure 4. At this point the laterally extending portion of the catch 21 engages the pin 22 and at this point also the pin 16 is engaged by the notch 36 in the lever 33, providing the high point of the cam 38a is not in contact with the arm 37 of the lever 33. The arm 16 and connected weight block 13 are raised to this position by the laterally extending portion of the lever 24. Simultaneous with this action the depending portion 26 of the arm 24 engages the spring 5 to move it and its associated parts to the left against the tension of the spring 5 as shown in Figure 4. The movement of the arm 24 to this position shown in Figure 4 also raises the spring 28, carried by the pin 27, and associated weight 29 to the raised position illustrated in Figure 4.

The second stage of the cycle of operation occurs when the handle 19 is depressed beyond the position shown in Figure 4 causing the pin 22 to rotate the catch 21 in a counter-clockwise direction from the position illustrated in Figure 4 to release the pin 23 from the notch in the lever 21. The weight 29 and the tension of the spring 5 against the depending portion 26 of the arm 24 causes the arm 24 and depending portion 26 to rotate sharply in a counter-clockwise direction until the depending portion 26 engages the portion 55 of the plate 57. Inertia of the weight 29 when the lever 24 reaches the lower-most position as illustrated in Figure 1 extends the spring 28 sufficiently to permit the weight 29 to strike the bell 32 thereby producing an audible signal to indicate to the shooter that his command has been promptly obeyed.

The moving of the lever 24 to the position shown in Figure 1 moves the depending portion 26 of the lever 24 clear of the spring 5 so as to permit the spring 5 and its supported weights 48 and 49 to oscillate. The oscillation of the spring 5 moves the pawls 42 and 43 back and forth in engagement with the ratchet wheel 39 thereby rotating the ratchet wheel. If desired one or more of the teeth of the ratchet wheel may be omitted as indicated in Figures 1 and 4 to produce a more erratic rotation of the ratchet wheel since when either of the pawls engages the portion of the wheel from which these teeth are missing, it will cause that pawl to fail to rotate the ratchet wheel during that particular stroke of the pawl. The ratchet 39 is of a size determined by the relation of the time cycle of oscillation of the spring 5 and the stroke of the pawls 42 and 43 together with the delay occasioned by the omission of the teeth in the ratchet wheel to permit a maximum cycle of rotation of three seconds where a maximum three second delay is desired as in the case of skeet shooting. As the ratchet wheel 39 is rotated to bring the high point of the cam 38a into engagement with the arm 37 and it thereby raises the lower end of the arm 37. This raising of the lower end of the arm 37 by means of the cam 38a, pivotally moves the lever 33 in a counter-clockwise direction moving the notch 36 out of engagement with the pin 16 and permitting the pin 16 and associated weight 13 to drop, thereby initiating the third stage of the operation of the device.

The third stage of the operation initiated by the release of the pin 16 occurs as the weight 13 reaches the bottom of its stroke wherein the pin 14 engages the spring 58, the inertia of the weight 13 depressing the spring 58 to permit the pin 14 to strike the insulated stud 59 mounted on the contact spring 60 and depressing the spring contact 60 to momentarily close the switch 61.

Figure 2:
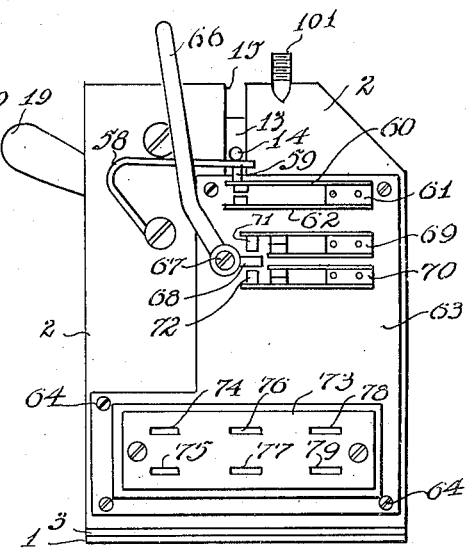
Figure 2 is a view in side elevation of the mechanism shown in Figure 1 showing the opposite side of the device from that shown in Figure 1.

This causes a current flow from the battery 83 through the conductor 84 the contact springs 60 and 62, the conductor 85 through the closed contacts of the switch 69 (the lever 66 and the tongue 68 being in the position indicated in Figures 2 and 16) through the conductor 87, the plug socket 74, the conductor 90, the electro-magnet 91, thence through the conductor 93, the conductor 89, the plug socket 77 and thence to battery 83 through the conductor 85, operating the electro-magnet 91 to release the trap sear 92.

Simultaneously with the above a parallel circuit is established from the conductor 85 through the conductor 86, the closed switch 70 the conductor 88 the plug socket 78 the conductor 94, through the electro-magnet 95 and thence through the conductor 97, the plug socket 79, the conductor 77 and the conductor 85 to the battery 83. This energizes the electro-magnet 95 to release the trap sear 96 simultaneously with the release of the trap sear 92.

If it is desired to operate either of the traps independently of the other the lever 66 may be pivotally moved in either direction from the position shown in Figures 2 and 16 to selectively disconnect either of the traps from the circuit.

Moving the lever clockwise from the position shown in Figures 2 and 16 will raise the tongue 68 into engagement with the stud 71 thereby opening the switch 69 to remove the electromagnet 95 from the circuit.

Moving the lever 66 counter-clockwise from the position of Figures 2 and 16 will depress the tongue 68 to open the switch 70 and thus remove the electro-magnet 91 from the circuit.

The device comprises a simple and positive delayed action trap release timer, the time interval being automatically varied beyond the control of an operator, the time varying between instantaneous actuation as in the case where the cam 38a stops with the high point thereof in engagement with the lever 37 to hold the notch 36 beyond the pin 40 to permit the weight 13 to drop simultaneously with the lever 24, up to the maximum time of rotation of the ratchet wheel 39, here set forth as three seconds. The maximum time cycle will occur of course, when the cam 38a stops with its high point just beyond the lever 37 so that almost a complete rotation of the ratchet wheel is required to bring the high point of the cam into engagement with the lever 37.

I claim:

1. A variable delay circuit closer comprising in combination, a switch, a weight mounted to operate said switch upon a release of said weight, setting means mounted to raise said weight to a suspended position, and mechanically actuated means actuated upon a suspension of said weight to release said weight upon the completion of an indeterminate cycle of operation of said mechanically actuated means to operate said switch.

2. A variable delay circuit closer comprising in combination, a switch, switch actuating means having a set and an actuated position, setting means mounted to move said switch actuating means to a set position, releasable means mounted to retain said actuating means in a set position, and self-varying time delay means energized by an operation of said setting means to release said switch actuating means upon the completion of an indeterminate cycle of operation of said time delay means.

3. A variable delay circuit closer comprising in combination, a switch actuating means having a set and an actuated position, a releasable member mounted to retain said actuating means in a set position, a pendulum, ratchet means mounted to be actuated by an oscillation of said pendulum, a cam operatively associated with said ratchet means and with said releasable member to be rotated by an actuation of said ratchet means, and a setting means mounted to move said switch actuating means to a set position, and to simultaneously oscillate said pendulum to rotate said cam an indeterminate portion of its cycle to release said switch actuating means.

4. A variable delay circuit closer comprising in combination, a switch, switch actuating means having a set and an actuated position, a releasable member mounted to retain said actuating means in a set position, a setting member mounted to move said switch actuating means to a set position on an operation thereof, an oscillating element mounted to be set in oscillation by an operation of said setting member, cyclic means operatively connected to said oscillating element to be moved in a recurring cycle by said oscillating element, and means operatively connecting said cyclic operating means to said releasable member to release said switch actuating means at a predetermined point in the cycle of said cyclic means.

5. A variable delay circuit closer comprising in combination, a switch, actuating means having a set and an actuated position, a releasable means mounted to retain said actuating means in set position, a setting member mounted to move said switch actuating means to a set position on an operation thereof, an oscillating element mounted to be set in oscillation by an operation of said manually actuated means, signal means operatively connected to said setting member to be operated simultaneously with said oscillating element, cyclic means operatively connected to said oscillating element to be moved in a recurring cycle by said oscillating element, and means connecting said cyclic operating means to said releasable member to release said switch actuating means at a predetermined point in the cycle of said cyclic means.

6. A variable delay circuit closer comprising in combination, a switch, switch actuating means having a set and an actuated position, a releasable member mounted to retain said actuating means in a set position, a setting means, an oscillating element mounted to be oscillated by a movement of said setting means, cyclic means operatively connected to said oscillating element to be moved in a recurring cycle by said oscillating element, and means connecting said cyclic operating means to said releasable member to release said switch actuating means at a predetermined point in the cycle of said cyclic means.

7. A variable delay circuit closer comprising in combination, a switch, a weighted switch actuating member having a raised set position and a lowered actuated position, a notched lever mounted to engage said weighted member to support said weighted member in a raised set position, a lever pivotally mounted adjacent said weighted member and having a portion thereof positioned to engage said weighted member to raise said weighted member to a set position on a pivotal movement of said lever, a resiliently supported pendulum, a lever element mounted adjacent said pendulum, a setting means having releasable connection with said weight raising lever and pendulum actuating lever element, stop means mounted to release the connection between said setting means and said weight and pendulum actuating lever elements at a predetermined point in the operation of said setting means to simultaneously engage said weight element in said notched lever, and to release said pendulum for oscillation, and a ratchet having a cam associated therewith operatively connected to said pendulum and to said notched lever to rotate said cam upon an oscillation of said pendulum to release said weighted member from said notched lever at a predetermined point in the rotation of said cam.

8. A variable delay circuit closer, comprising in combination, a switch, switch actuating means having a raised set, and a gravity-lowered actuated position, setting means mounted to raise said actuating means to a set position, releasable means mounted to retain said actuating means in a set position, and self-varying time delay means, energized by an operation of said setting means to release said switch actuating means upon the completion of an indeterminate cycle of operation of said time delay means.

ARTHUR E. ROTH.